US009267458B2

(12) United States Patent
Sakaguchi et al.

(10) Patent No.: US 9,267,458 B2
(45) Date of Patent: Feb. 23, 2016

(54) CONTROL APPARATUS FOR GENERAL PURPOSE ENGINE

(75) Inventors: Ryo Sakaguchi, Chiyoda-ku (JP); Yasuhiko Ishida, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 792 days.

(21) Appl. No.: 13/567,379

(22) Filed: Aug. 6, 2012

(65) Prior Publication Data

US 2013/0197784 A1 Aug. 1, 2013

(30) Foreign Application Priority Data

Jan. 30, 2012 (JP) ................................ 2012-016936

(51) Int. Cl.
| | |
|---|---|
| *G01M 15/11* | (2006.01) |
| *F02D 41/34* | (2006.01) |
| *F02D 41/04* | (2006.01) |
| *F02D 41/22* | (2006.01) |
| *F02D 41/14* | (2006.01) |

(52) U.S. Cl.
CPC .............. *F02D 41/042* (2013.01); *F02D 41/22* (2013.01); *F02D 41/34* (2013.01); *F02D 41/1454* (2013.01); *F02D 2200/1015* (2013.01); *G01M 15/11* (2013.01); *Y02T 10/44* (2013.01)

(58) Field of Classification Search
CPC . G01M 15/10; G01M 15/102; G01M 15/104; G01M 15/11; F02D 2200/1015
USPC ............ 123/672, 673, 674, 679, 690, 406.12, 123/406.13, 406.14; 701/107; 73/114.02, 73/114.03
See application file for complete search history.

(56) References Cited

U.S. PATENT DOCUMENTS

| | | | | |
|---|---|---|---|---|
| 3,983,754 | A | * 10/1976 | Deguchi et al. | ................ 361/162 |
| 4,006,718 | A | * 2/1977 | Konomi | ........................ 123/686 |
| 4,040,294 | A | * 8/1977 | Matsuda et al. | ........... 73/114.07 |

(Continued)

FOREIGN PATENT DOCUMENTS

| | | |
|---|---|---|
| JP | 2-291476 A | 12/1990 |
| JP | 03-064645 A | 3/1991 |

(Continued)

OTHER PUBLICATIONS

Japanese Office Action, Patent Appln No. 2012-016936, Nov. 13, 2012.

*Primary Examiner* — Thomas Moulis
(74) *Attorney, Agent, or Firm* — Sughrue Mion, PLLC; Richard C. Turner

(57) ABSTRACT

A general purpose engine control apparatus can detect misfire occurrence with high accuracy, while reducing adaptation man hours of misfire determination. The apparatus includes a first air/fuel ratio determiner to make a rich/lean determination, an injection amount corrector to calculate a corrected injection amount corresponding to a stoichiometric air/fuel ratio, an injection controller to supply fuel to the engine so as to match the corrected injection amount, a second air/fuel ratio determiner to make a rich/lean determination based on a comparison of the O2 sensor output with a rich and a lean determination voltage, a rich/lean period calculator to calculate a rich/lean period according to the determination of the second air/fuel ratio determiner, and a misfire determiner to determine the presence or absence of a misfire based on the rich/lean period. The injection controller stops fuel injection to the engine in the presence of a misfire.

8 Claims, 11 Drawing Sheets

(56) References Cited

U.S. PATENT DOCUMENTS

| | | | |
|---|---|---|---|
| 4,445,326 A * | 5/1984 | Lyon | 60/277 |
| 5,069,035 A * | 12/1991 | Kayanuma | 60/274 |
| 5,168,859 A * | 12/1992 | Ohsaki | 123/679 |
| 5,224,452 A * | 7/1993 | Tomizawa | F02D 41/1475 |
| | | | 123/436 |
| 5,227,975 A * | 7/1993 | Nakaniwa | 701/103 |
| 5,471,870 A * | 12/1995 | Kuroda et al. | 73/114.02 |
| 5,616,858 A * | 4/1997 | Angermeier et al. | 73/114.07 |
| 5,638,278 A * | 6/1997 | Nishimura et al. | 701/111 |
| 5,728,941 A * | 3/1998 | Yamamoto et al. | 73/114.04 |
| 5,945,597 A * | 8/1999 | Poublon et al. | 73/114.75 |
| 6,338,326 B1 * | 1/2002 | Ebeling | G01M 15/11 |
| | | | 123/198 F |
| 6,516,772 B2 * | 2/2003 | Ueno | F02D 37/02 |
| | | | 123/295 |
| 6,520,159 B2 * | 2/2003 | White et al. | 123/481 |
| 7,051,725 B2 * | 5/2006 | Ikemoto et al. | 123/673 |
| 7,243,532 B2 * | 7/2007 | Tsujimura et al. | 73/114.02 |
| 7,280,906 B2 * | 10/2007 | Schneider et al. | 701/109 |
| 8,509,984 B2 * | 8/2013 | Kidokoro et al. | 701/29.1 |
| 2012/0029790 A1 * | 2/2012 | Maruyama | 701/103 |
| 2013/0158841 A1 * | 6/2013 | Ito et al. | 701/104 |

FOREIGN PATENT DOCUMENTS

| | | |
|---|---|---|
| JP | 04-017756 A | 1/1992 |
| JP | 04-041958 A | 2/1992 |
| JP | 09-042026 A | 2/1997 |

* cited by examiner

CONTROL APPARATUS FOR GENERAL PURPOSE ENGINE

TECHNICAL FIELD

The present invention relates to a control apparatus for a general purpose or versatile engine which serves to control the amount of fuel injection of the general purpose engine which is equipped with a three-way catalyst arranged in an exhaust passage, and in particular, to a misfire detection technique at the time of the operation of the general purpose engine, as well as to a protection technique for a three-way catalyst at the time of the occurrence of a misfire.

BACKGROUND ART

In the past, in ordinary engine control apparatus, a signal in synchronization with the rotation of an engine is used at the time of controlling the ignition timing, fuel injection, etc., of the engine, but in cases where ignition is not carried out in a normal manner due to the failure of an ignition control system, etc., a misfire may occur, so that unburnt gas can be discharged, thus leading to the occurrence of defect or trouble in an exhaust system.

In addition, upon the occurrence of a misfire, the reduction of the engine output and the reduction of engine stability will be caused, and besides, the unburnt gas will be discharged as it is, thus resulting in an increase of harmful components in the exhaust gas.

Further, in cases where the unburnt gas burns inside a three-way catalyst which is arranged in an exhaust passage, there is a problem that the temperature of the three-way catalyst goes up unusually, causing damage or deterioration of the three-way catalyst.

Accordingly, in order to avoid the above-mentioned problems, there has been proposed a misfire detection device for an internal combustion engine (for example, see a first patent document).

In the conventional misfire detection device described in the above-mentioned first patent document, the angular velocity of the engine is calculated from a deviation between the current rotation period and the last rotation period detected by an engine rotation period detecting means, and the angular velocity and the angular velocity deviation at the time of the occurrence of a misfire are adapted in advance for every engine operating state to adaptively prepare a misfire determination angular velocity determination value, so that in cases where the angular velocity of the engine during operation thereof is larger than the misfire determination angular velocity determination value thus adaptively prepared, a determination is made that a misfire has occurred.

On the other hand, in general purpose engines which are mounted on products such as an electric generator, a lawn mower, etc., it is known that it is desirable for the engine to be driven to operate at an air fuel ratio at which the output power of the engine becomes a maximum (a so-called output air fuel ratio) and which is richer than the stoichiometric air fuel ratio.

In addition in recent years, the strengthening of exhaust emission control values according to legal regulations is also promoted in general purpose engines from the point of view of environmental protection, and hence it is required that the general purpose engines be each equipped with a three-way catalyst and an O2 sensor, similar to car or automobile engines, so that they are controlled at a stoichiometric air fuel ratio at which the purification rate of the three-way catalyst is high.

However, those equipment on which general purpose engines are mounted may be difficult to carry out periodical maintenance, and so, they are often continued to be operated, while malfunctions in the general purpose engines are not been noticed.

In such a case, if an operating person has continued to operate a general purpose engine, without noticing a malfunction thereof (e.g., a defect of an ignition system such as a spark plug, etc.), it will be concerned, similarly as stated above, that unburnt gases generated by misfiring burn in the three-way catalyst arranged in the exhaust passage to raise the temperature of the three-way catalyst in an abnormal manner, so that the three-way catalyst may be damaged, resulting in a remarkable reduction in the exhaust gas purification ability thereof.

In addition, the deteriorated state of the exhaust gas due to the damage to the three-way catalyst is not sensed or noticed by the operating person, and hence in the worst case, harmful components in excess of the exhaust emission control values may continue to be discharged into the atmospheric air.

Here, note that, as in the above-mentioned first patent document, a misfire detection device based on the fluctuation of the angular velocity of an engine has been proposed, but in the case of a general purpose engine, it is difficult to detect, because of the engine structure, the fluctuation of the angular velocity of the engine due to misfiring thereof.

This is because the general purpose engine, being used in a lower rotational speed range in comparison with ordinary engines, is designed to have a large rotational inertia so that a stable operation can be obtained at low speed rotation.

In view of such a structure, the fluctuation of the angular velocity of a general purpose engine at the time of misfire can not be easily detected, and products and equipment on which general purpose engines are mounted cover a wide variety of range, and hence, it is also difficult to specify loaded conditions in advance.

PRIOR ART REFERENCES

Patent Documents

First Patent Document: Japanese patent application laid-open No. H02-291476

SUMMARY OF THE INVENTION

Problems to be Solved by the Invention

The conventional control apparatus for a general purpose engine has the following problem: that is, it is difficult to detect the fluctuation of the angular velocity due to misfiring, and so, even if the fluctuation of the angular velocity occurs, a determination can not be made as to whether the fluctuation is a change resulting from misfiring or a change resulting from a load change of mounted equipment, and the setting (adaptation) of a misfire determination value in the fluctuation of the angular velocity is difficult, and even if such adaptation can be made, a lot of man hours are required for the setting of the misfire determination value, thus making it impractical.

In addition, it is impossible as a matter of fact to make misfire determination and verification for all the products on which general purpose engines are mounted, and hence, there has also been a problem that an incorrect determination might be made in the worst case.

The present invention has been made in order to solve the problems as referred to above, and has for its object to obtain a control apparatus for a general purpose engine in which the occurrence of a misfire can be detected with a high degree of accuracy, while reducing the adaptation man hours of the misfire determination, and in which the engine is stopped at the time of the occurrence of a misfire, thereby preventing damage to a three-way catalyst, and at the same time suppressing discharge of harmful components into the atmospheric air.

Means for Solving the Problems

A control apparatus for a general purpose engine according to the present invention is provided with: a variety of kinds of sensors that generate detected values corresponding to a load and a rotational speed of the general purpose engine; a three-way catalyst that is arranged in an exhaust passage of the general purpose engine; an O2 sensor that is arranged at the upstream side of the three-way catalyst; a basic injection amount calculation unit that calculates a basic amount of fuel to be injected to the general purpose engine based on the individual detected values of the variety of kinds of sensors; a first air fuel ratio determination unit that determines, based on an output value of the O2 sensor, whether an air fuel ratio of a mixture is rich or lean; a fuel injection amount correction unit that carries out feedback correction of the basic fuel injection amount to a value corresponding to a stoichiometric air fuel ratio in accordance with a result of the determination of the first air fuel ratio determination unit; a fuel injection control unit that supplies fuel to the general purpose engine so as to make it match a corrected fuel injection amount calculated by the fuel injection amount correction unit; a second air fuel ratio determination unit that determines, based on a comparison of the output value of the O2 sensor with a rich determination voltage and a lean determination voltage, whether the air fuel ratio of the mixture is rich or lean; a rich lean period calculation unit that calculates a rich lean period of the output value of the O2 sensor in accordance with a result of the determination of the second air fuel ratio determination unit; and a misfire determination unit that determines the presence or absence of a misfire in the general purpose engine based on the rich lean period of the output value of the O2 sensor; wherein the fuel injection control unit stops the injection of fuel to the general purpose engine, in cases where it is determined by the misfire determination unit that there is a misfire.

Effect of the Invention

According to the present invention, even in a general purpose engine which has a large rotational inertia and covers a variety of kinds of models on which the engine is mounted, it is possible to detect a misfire with a high degree of accuracy at the time of the occurrence thereof, and by stopping fuel injection at the time of the occurrence of a misfire, damage to a three-way catalyst can be prevented, thereby making it possible to prevent harmful components from continuing to be discharged into the atmospheric air.

BEST MODES FOR CARRYING OUT THE INVENTION

First Embodiment

Hereinafter, a first embodiment of the present invention will be explained in detail while referring to the accompanying drawings. Here, note that the explanation will be made with identical symbols being attached to those which are the same as or correspond to one another in respective views.

Figure 1:
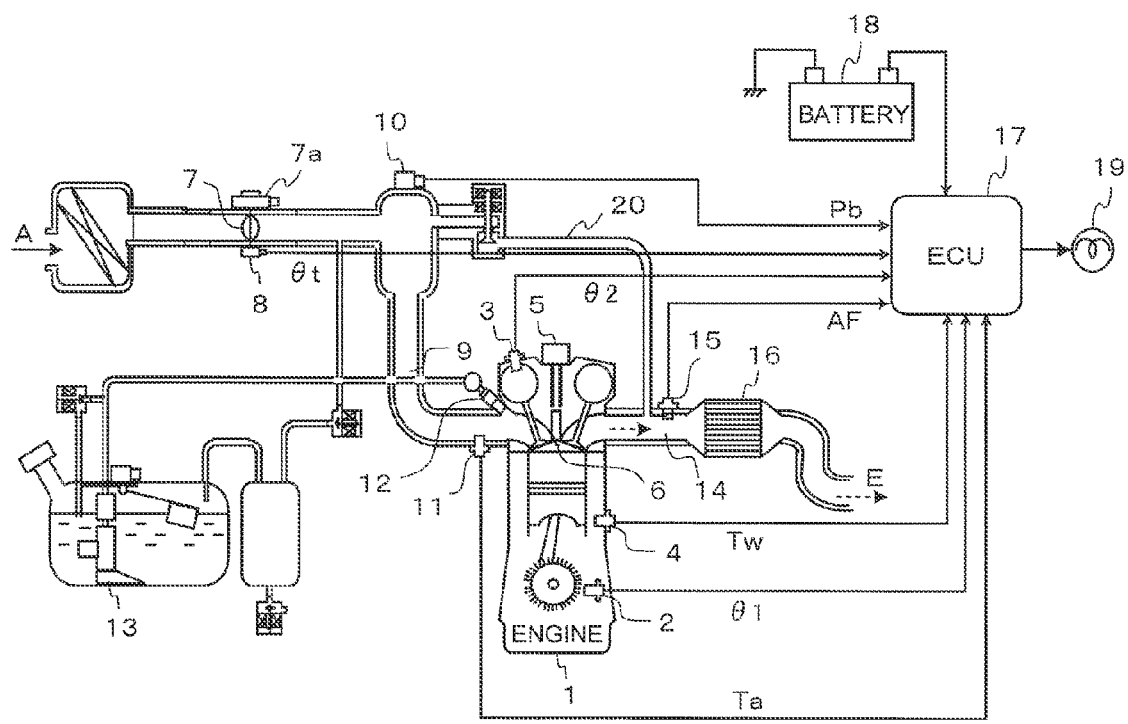
FIG. 1 is a construction view showing an entire system of a control apparatus for a general purpose engine according to a first embodiment of the present invention.

FIG. 1 is a construction view showing an entire system of a control apparatus for a general purpose engine according to a first embodiment of the present invention, wherein the relation between the internal combustion engine and the control apparatus is shown in a schematic manner.

In FIG. 1, the control apparatus for a general purpose engine is provided, as a construction related to a general purpose engine 1 (hereinafter simply abbreviated as "the engine 1"), with a crank angle sensor 2, a cam angle sensor 3, a water temperature sensor 4, an ignition coil 5, a spark plug 6, a throttle valve 7, a throttle actuator 7a, a throttle sensor 8, an intake passage 9, an intake air pressure sensor 10, an intake air temperature sensor 11, an injector 12, a fuel pump 13, an exhaust passage 14, an O2 sensor 15, a three-way catalyst 16, an ECU 17, a battery 18, a malfunction or failure indicator 19, and an EGR passage 20.

The engine 1 has the ignition coil 5, the spark plug 6 and the injector 12 mounted thereon, and the engine 1 is in communication with the intake passage 9 and the exhaust passage 14 through an intake valve and an exhaust valve, respectively In addition, the EGR passage 20 is in communication between the exhaust passage 14 and the intake passage 9 through an EGR valve.

The throttle valve 7 for regulating the amount of intake air sucked into the engine 1 and the throttle actuator 7a for driving to open and close the throttle valve 7 are arranged in the intake passage 9.

On the other hand, the three-way catalyst 16, which serves to purify an exhaust gas E discharged from the engine 1, is arranged in the exhaust passage 14.

Among various kinds of analog output sensors which serve to detect an operating state and a loaded condition of the engine 1, the crank angle sensor 2 detects a crank angle degree θ1; the cam angle sensor 3 detects a cam angle degree θ2; the water temperature sensor 4 detects an engine cooling water temperature Tw; and the intake air temperature sensor 11 detects the temperature Ta of intake air A.

The throttle sensor 8 detects an angle θt of the throttle valve 7, and the intake air pressure sensor 10 is arranged at a location downstream of the throttle valve 7, so that it detects a pressure Pb in the intake passage 9.

In addition, the O2 sensor 15 is arranged at the upstream side of the three-way catalyst 16, so that it outputs a detected value AF corresponding to an oxygen concentration (air fuel ratio) in the exhaust passage 14.

The injector 12 injects the fuel supplied from the fuel pump 13 into an intake manifold of the intake passage 9 connected to each cylinder of the engine 1.

The ignition coil 5 supplies electric power or electric energy to the spark plug 6, so that the spark plug 6 can ignite or fire a mixture of air and gasoline by electric discharge sparks.

Here, note that the above-mentioned various kinds of sensors are shown by way of example, and there is no need to include all of these sensors as component elements of the control apparatus according to the first embodiment of the present invention, and thus, there may be cases where those which are needed or provided are less than or more than the various kinds of sensors as mentioned above.

The detected information of the various kinds of sensors is inputted to the ECU (Electronic Control Unit) 17.

The ECU 17 calculates amounts of control (variables) for controlling the engine 1 based on the crank angle degree θ1 from the crank angle sensor 2, the cam angle degree θ2 from the cam angle sensor 3, and the input information from the other various kinds of sensors, so that it drives and controls the various kinds of actuators such as the ignition coil 5, the throttle actuator 7a, the injector 12, and so on.

In addition, the ECU 17 carries out air fuel ratio feedback control (so-called O2 feedback control) based on the detected value AF of the O2 sensor 15 (which indicates "rich" or "lean"), by regulating the injection time (the amount of fuel injection) of the injector 12 in such a manner that the air fuel ratio is made to match or coincide with a target air fuel ratio.

Further, in cases where a certain failure is detected in the engine 1 and its various kinds of control functions, the ECU 17 drives the failure indicator 19 for informing the occurrence of the failure, so that the operating person can be warned of an abnormal state of the engine 1 or the like.

As the failure indicator 19, there can be used, for example, a MIL (Malfunction Indicator Lamp) or the like, which is able to perform a lighted indication, a blinking indication, etc.

Figure 2:
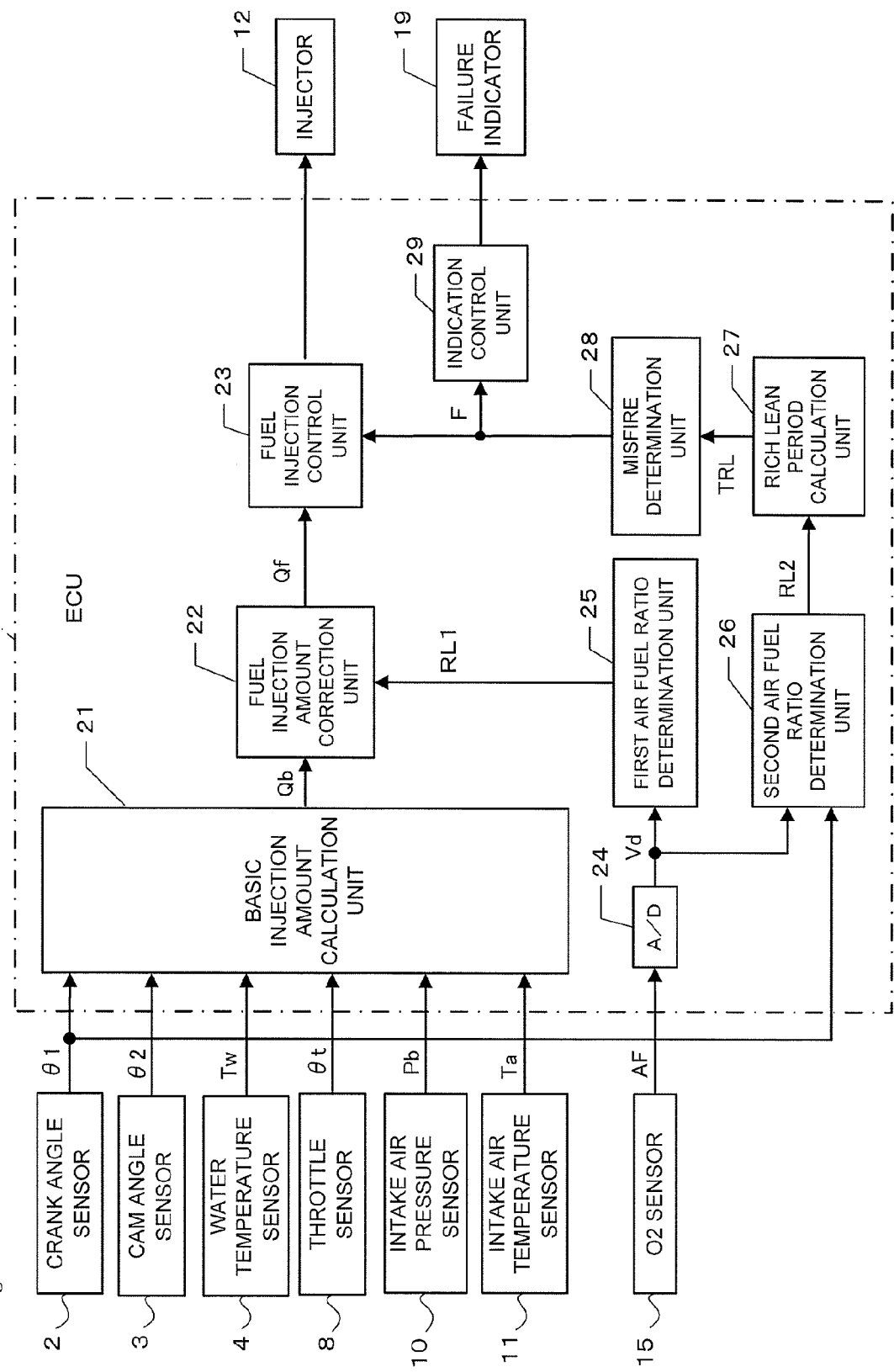
FIG. 2 is a block diagram showing the function configuration of the control apparatus for a general purpose engine according to the first embodiment of the present invention.

FIG. 2 is a block diagram showing the functional configuration of the ECU 17, wherein only those functions which are related to misfire determination control and fuel injection control are shown representatively.

In FIG. 2, the ECU 17 is provided with a basic injection amount calculation unit 21, a fuel injection amount correction unit 22, a fuel injection control unit 23, an AD converter 24, a first air fuel ratio determination unit 25, a second air fuel ratio determination unit 26, a rich lean period calculation unit 27, a misfire determination unit 28, an indication control unit 29, and various kinds of unillustrated actuator control units (a throttle control unit, an ignition control unit, and so on).

The basic injection amount calculation unit 21 takes in the detected values of the various kinds of sensors while carrying out A/D conversion thereof, so that it calculates the load of the engine 1 from a throttle angle degree θt of the throttle valve 7 or an intake passage pressure Pb in the intake passage 9, and at the same time, calculates an engine rotational speed RE from the crank angle degree θ1, whereby a basic fuel injection amount Qb to be supplied to the engine 1 is calculated based on the individual detected values corresponding to the engine load and the engine rotational speed RE thus obtained.

Here, note that the crank angle degree θ1, which serves as an operation base of the ECU 17, is assumed to be inputted to the respective units in the ECU 17.

The AD converter 24 converts the detected value AF (analog signal) of the O2 sensor 15 into an A/D value Vd which is composed of a digital signal.

Based on a comparison between the A/D value Vd indicating the output value of the O2 sensor 15 and a rich lean determination voltage Vr, the first air fuel ratio determination unit 25 makes a determination as to whether the air fuel mixture is rich or lean, and generates a rich lean signal RL1 as its determination result.

The fuel injection amount correction unit 22 carries out the feedback correction of the basic fuel injection amount Qb to a value which corresponds to the stoichiometric air fuel ratio, in accordance with the determination result of the first air fuel ratio determination unit 25, i.e., the rich lean signal RL1, and calculates a corrected fuel injection amount Qf.

The fuel injection control unit 23 supplies fuel to the engine 1 by driving the injector 12 in such a manner that the amount of fuel to be injected by the injector 12 is made to match or coincide with the corrected fuel injection amount Qf thus calculated by the fuel injection amount correction unit 22.

The second air fuel ratio determination unit 26 sets, from the engine rotational speed RE based on the crank angle degree θ1, a rich determination voltage VR and a lean determination voltage VL which are different from the rich lean determination voltage Vr, and at the same time, a rich or lean determination is made based on a comparison of the A/D value Vd of the O2 sensor 15 with the rich determination voltage VR and the lean determination voltage VL, and a rich lean signal RL2 is generated as a result of the determination.

The rich lean period calculation unit 27 calculates a rich lean cycle or period TRL of the A/D value Vd in accordance with the determination result of the second air fuel ratio determination unit 26, i.e., the rich lean signal RL2.

The misfire determination unit 28 determines the presence or absence of a misfire in the engine 1 based on the rich lean period TRL, and sets a misfire failure flag F to "1" and outputs it in cases where it is determined that a misfire has occurred.

In cases where it is determined by the misfire determination unit 28 that a misfire has occurred (F=1), the fuel injection control unit 23 stops the fuel injection to the injector 12, and stops the operation of the engine 1.

In addition, the indication control unit 29 drives the failure indicator 19 in response to the presence of a misfire (F=1). At this time, the indication control unit 29 drives the failure indicator 19 in a mode different from other failure indications.

For example, at the time of a misfire, the indication control unit 29 drives the failure indicator 19 to blink, whereas at the time of other failures, it drives the failure indicator 19 to light.

Figure 3:
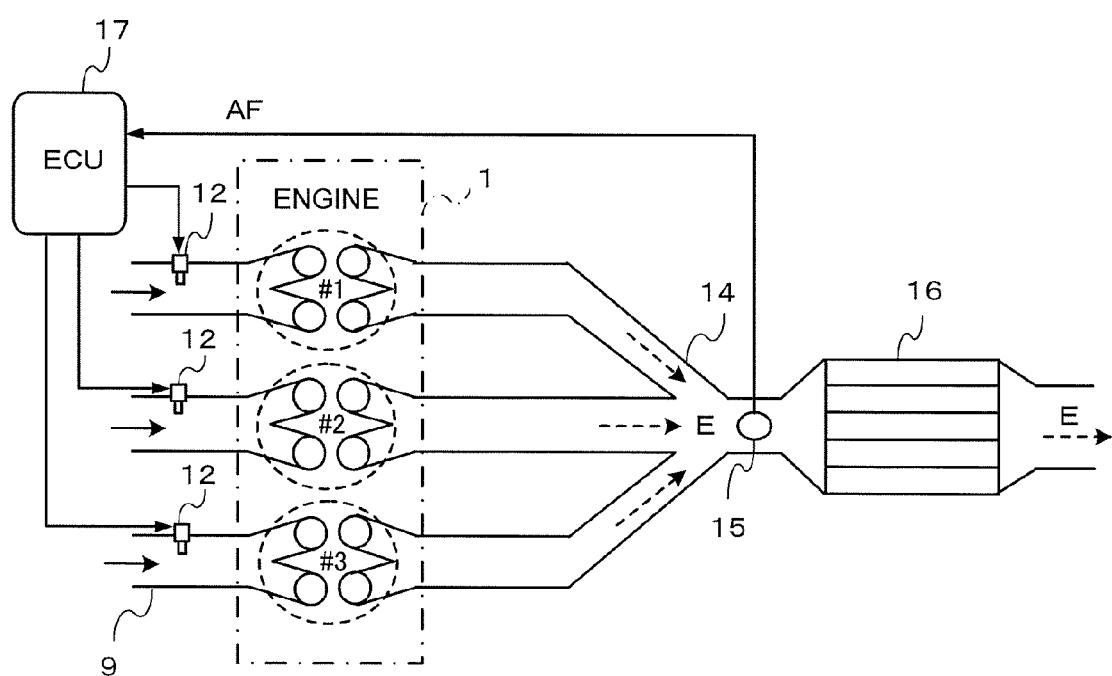
FIG. 3 is a construction view showing an example of the general purpose engine in FIG. 1.

FIG. 3 is a construction view showing a specific example of the engine 1, wherein the intake passage 9 and the exhaust passage 14 in the case of the engine 1 having three cylinders (#1 through #3) are shown on an enlarged scale.

Here, note that the three-cylinder engine is shown as an example, the general purpose engine in the present invention is not limited to the three-cylinder engine, but may be an engine having an arbitrary number of cylinders.

In FIG. 3, the O2 sensor 15 is arranged in a collection part (or exhaust manifold) of the exhaust ports of the individual cylinders or in the exhaust passage 14 at the downstream side of the exhaust manifold so that the oxygen concentration of an exhaust gas E in a state where exhaust gases from the individual cylinders are mixed with one another is detected as the detected value AF.

Figure 4:
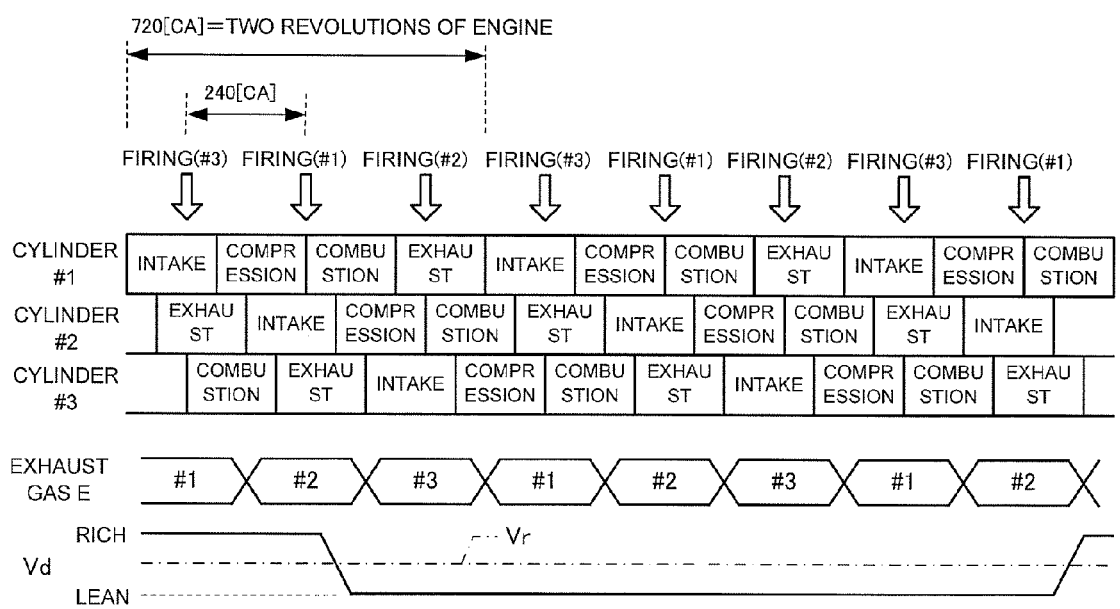
FIG. 4 is a timing chart showing a change of an output value of an O2 sensor when a misfire has not occurred in the example of FIG. 3.

FIG. 4 is a timing chart which shows the operation of the engine 1 (three-cylinder engine) of FIG. 3, wherein a rich lean change (inversion cycle) is shown based on a comparison of the output value (A/D value Vd) of the O2 sensor 15 at the time when a misfire does not occur, with the rich lean determination voltage Vr.

In FIG. 4, the four-stroke engine has four strokes comprising an intake stroke, a compression stroke, a combustion stroke, and an exhaust stroke, and in the neighborhood in which each of the cylinders (#1 through #3) changes from the compression stroke to the combustion stroke, ignition is carried out by means of the ignition coil 5 and the spark plug 6, so that the mixture of fuel and air is fired to combust or burn, and the exhaust gas E after combustion is discharged into the exhaust passage 14 in the exhaust stroke.

As shown in FIG. 4, the combustion strokes of the individual cylinders (#1 through #3) in the case of the three-cylinder engine are carried out in a state where they are shifted in phase by 240 degrees [CA] of the crank angle $\theta 1$ from one another.

In addition, in the case of the four-stroke engine, the combustion stroke takes a round while the engine 1 makes two revolutions, i.e., at the crank angle $\theta 1$ of 720 degrees [CA].

Accordingly, in cases where the firing order of the engine 1 is set in order of cylinder #1→cylinder #2→cylinder #3, following the exhaust stroke after ignition (combustion stroke), exhaust gases E in the individual cylinders (#1-#3) will be discharged into the exhaust passage 14 in a sequential manner with a phase difference of 240 degrees [CA], respectively.

As a result, the O2 sensor 15 arranged in the exhaust passage 14 will detect the oxygen concentrations of the exhaust gases E discharged from the individual cylinders in a sequential manner with a phase difference of 240 degrees [CA].

In general, in cases where misfiring does not occur, the cycle or period of the rich lean change in the course of the O2 feedback control is outputted depending on the engine rotational speed RE, and changes in about 0.5 seconds to 2 seconds in a periodic manner.

This is because the correction arithmetic operation or calculation of the fuel injection amount correction unit 22 in the course of the O2 feedback control is carried out in synchronization with the rotation of the engine 1.

However, in cases where misfire occurs resulting from a malfunction of the spark plug 6, etc., the air fuel mixture sucked into the engine 1 is discharged into the exhaust passage 14 as an unburnt gas, without being burned or combusted at ignition timing.

Figure 5:
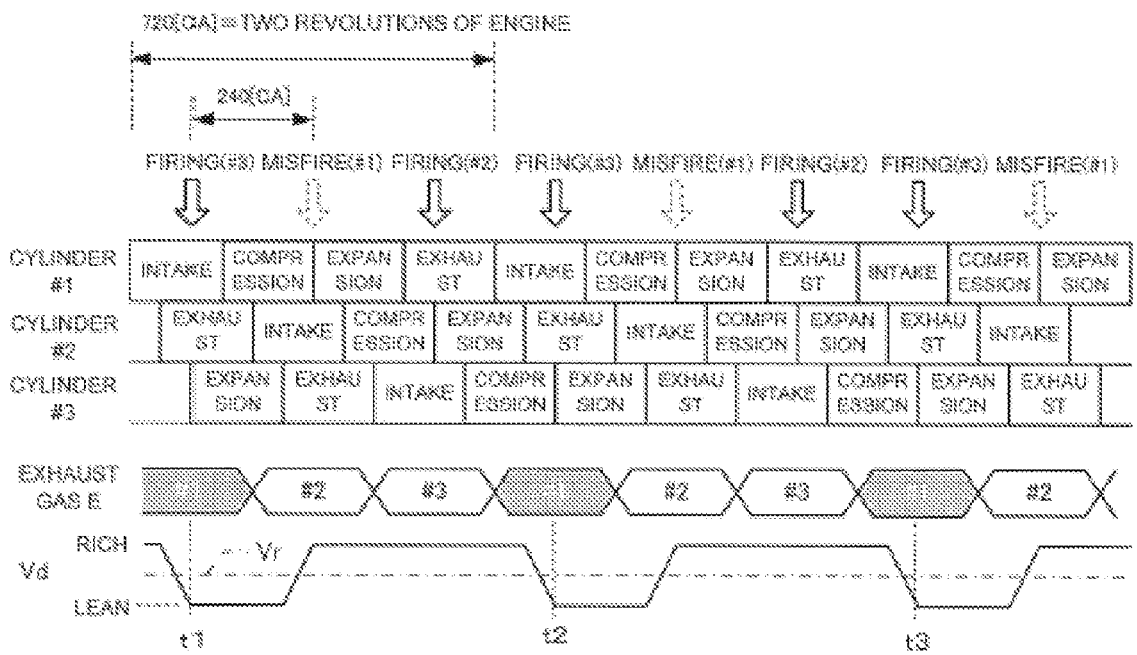
FIG. 5 is a timing chart showing a change of the output value of the O2 sensor when a misfire has occurred in the example of FIG. 3.

FIG. 5 is a timing chart which shows an operation in cases where a misfire has occurred in cylinder #1, wherein the rich lean change of the output value (A/D value Vd) of the O2 sensor 15 is shown, similar to FIG. 4.

In FIG. 5, a large amount of oxygen is contained in the unburnt gas, so the O2 sensor 15 generates an output value (A/D value Vd) indicative of a lean mixture at timing t1, t2 and t3, at which the unburnt gas in the misfire cylinder (#1) has been discharged into the exhaust passage 14, and the first air fuel ratio determination unit 25 will make a lean determination.

As stated above, in the case of a four-stroke engine, the combustion stroke takes a round during a period of time (720 degrees [CA]) in which the engine 1 makes two revolutions, so in cases where one cylinder (cylinder #1) has misfired, the O2 sensor 15 outputs a signal (A/D value Vd) indicative of a lean air fuel ratio once per two revolutions (720 degrees [CA]) of the engine 1.

In addition, at this time, if the O2 feedback control is being carried out, eventually, the detected value of the O2 sensor 15 will be outputted in a cycle or period in which the cycle or period of the rich lean change (FIG. 4) by the feedback control and the cycle or period of the rich lean change (FIG. 5) by misfiring superpose with each other.

Figure 6:
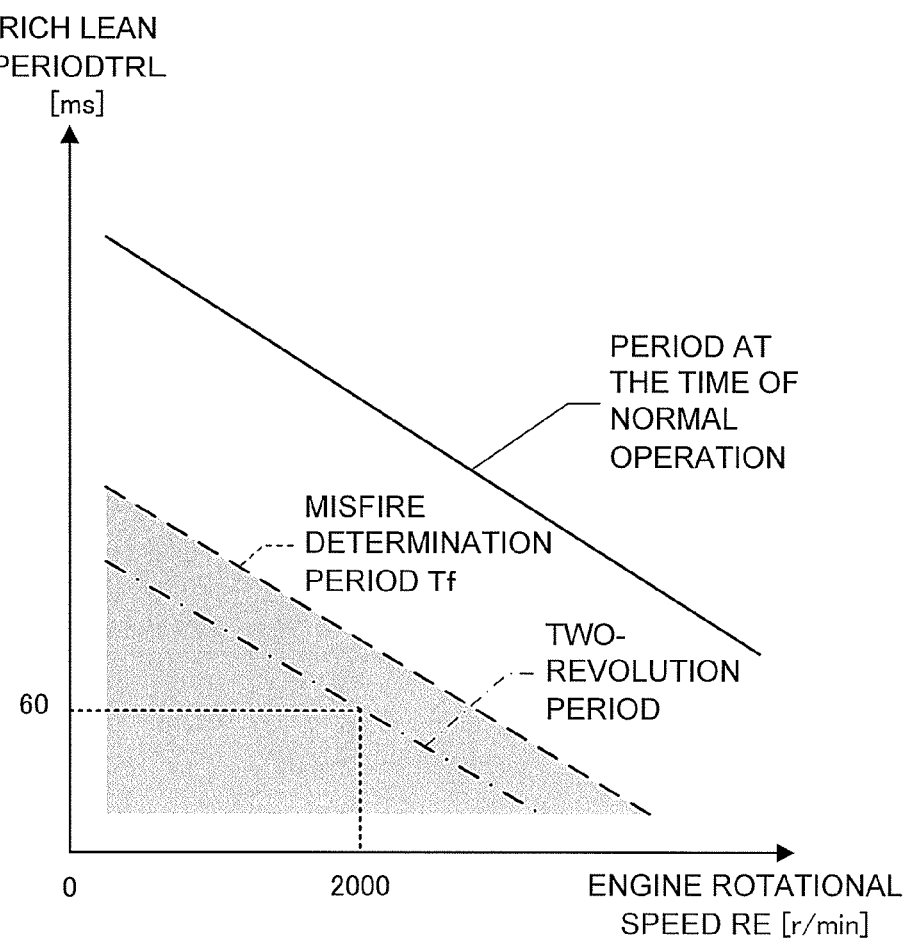
FIG. 6 is an explanatory view showing a misfire determination cycle or period in terms of the relation between an engine rotational speed and a rich lean cycle or period according to the first embodiment of the present invention.

Accordingly, in the first embodiment of the present invention, misfire detection is carried out by making use of the fact that the rich lean period TRL is different in the case where a misfire has not occurred and the case where a misfire has actually occurred, in the course of the O2 feedback control FIG. 6 is an explanatory view showing a misfire determination cycle or period Tf which becomes a misfire determination reference of the rich lean period TRL.

In FIG. 6, the misfire determination period Tf (indicated by a broken line) is set based on a characteristic of the rich lean period TRL with respect to the engine rotational speed RE.

Specifically, the misfire determination period Tf is set to a value which is obtained by multiplying a two-revolution period (=60×2/RE) of the engine 1 indicated by an alternate long and short dash line by a gain G (a map value of the engine rotational speed RE).

A gray area in FIG. 6 shows a misfire region where the rich lean period TRL does not reach the misfire determination period Tf.

In the following, reference will be made to an operation according to the first embodiment of the present invention, while referring to flow charts of FIG. 7 through FIG. 10 and explanatory views of FIG. 11 and FIG. 12 together with FIG. 1 through FIG. 5.

Figure 7:
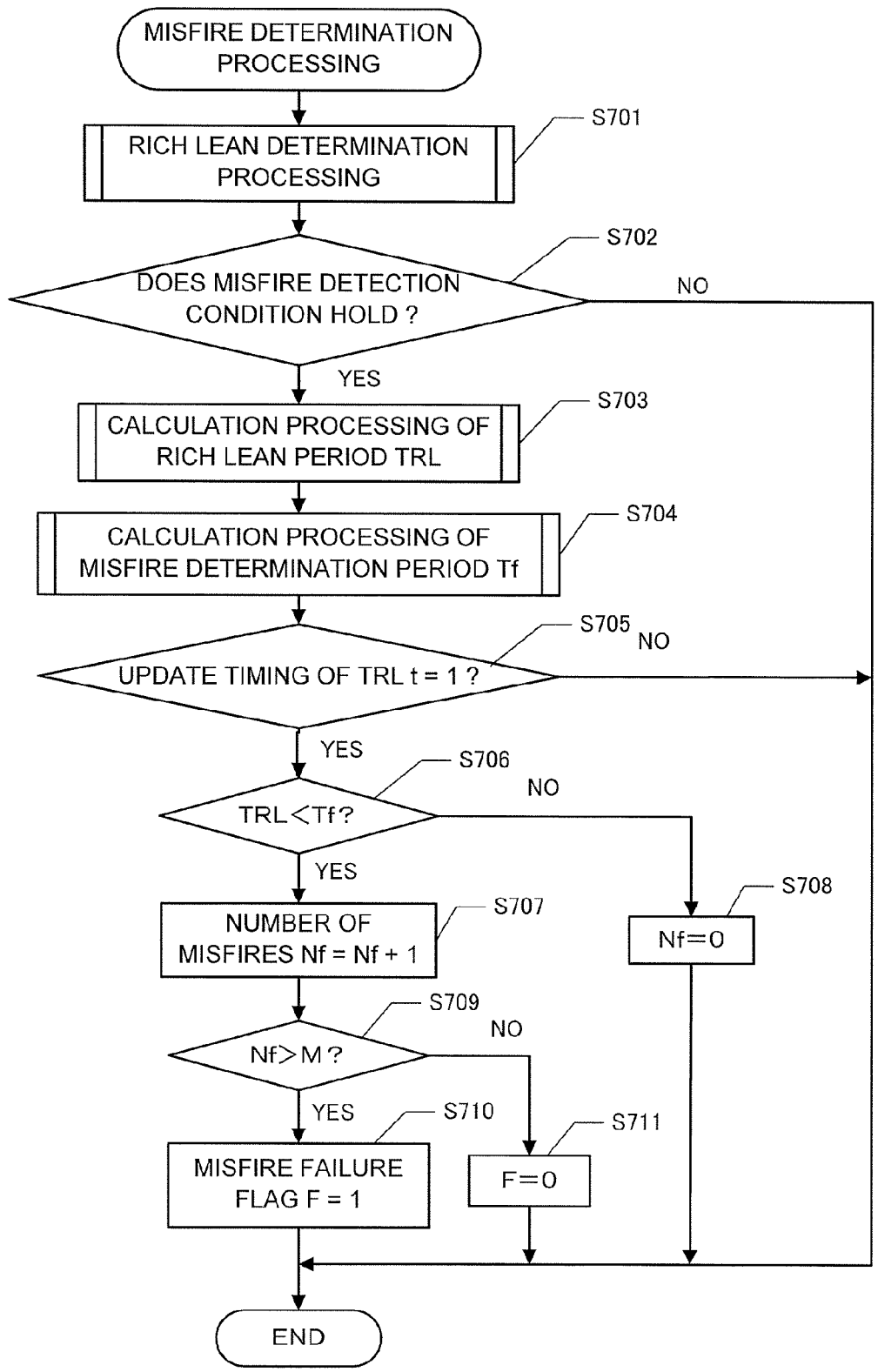
FIG. 7 is a flow chart showing misfire determination processing according to the first embodiment of the present invention.
Figure 8:
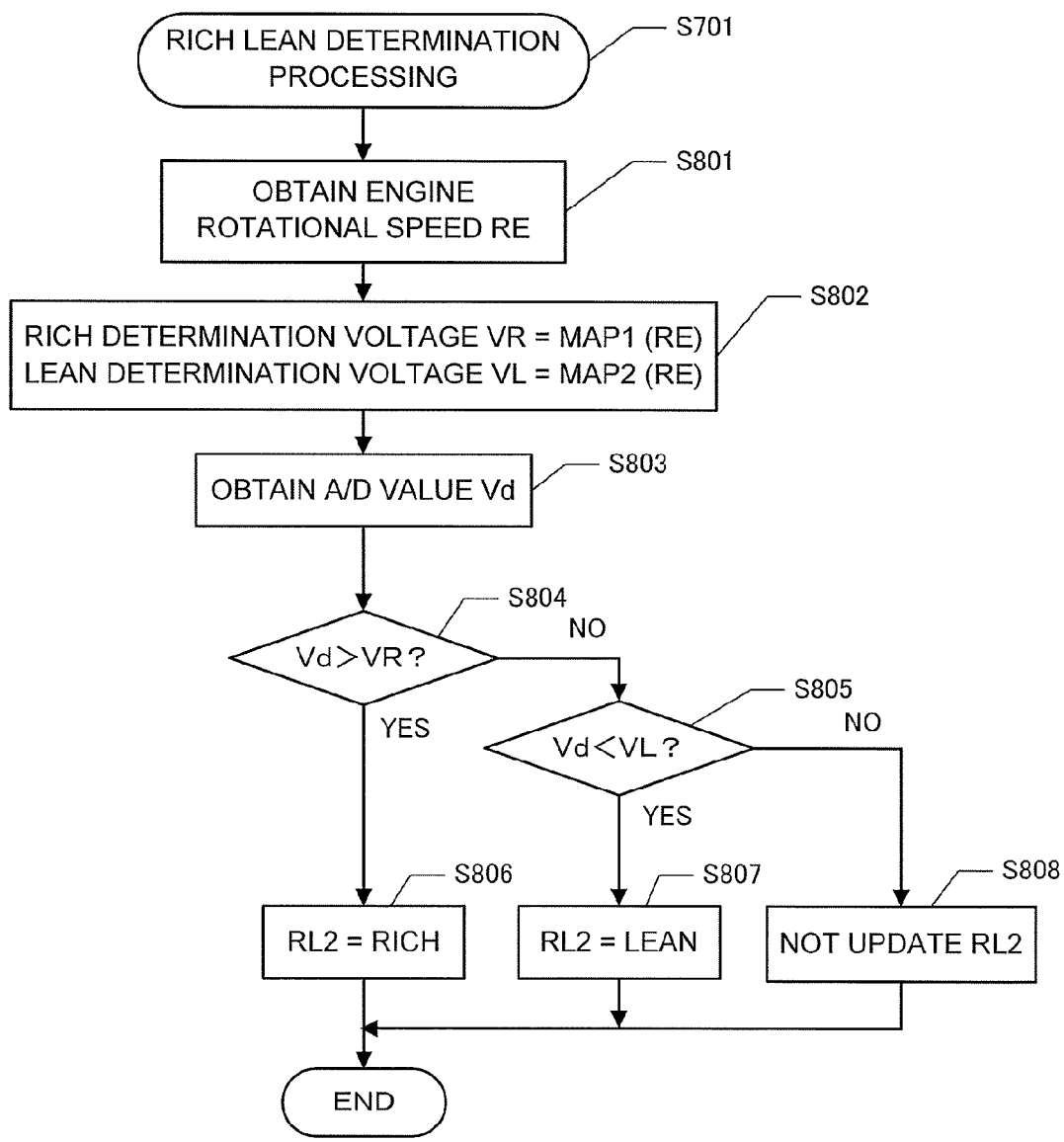
FIG. 8 is a flow chart specifically showing rich lean determination processing in FIG. 7.

FIG. 7 is a flow chart showing misfire determination processing according to the first embodiment of the present invention, and FIG. 8 is a flow chart specifically showing rich lean determination processing (step S701) in FIG. 7.

Figure 9:
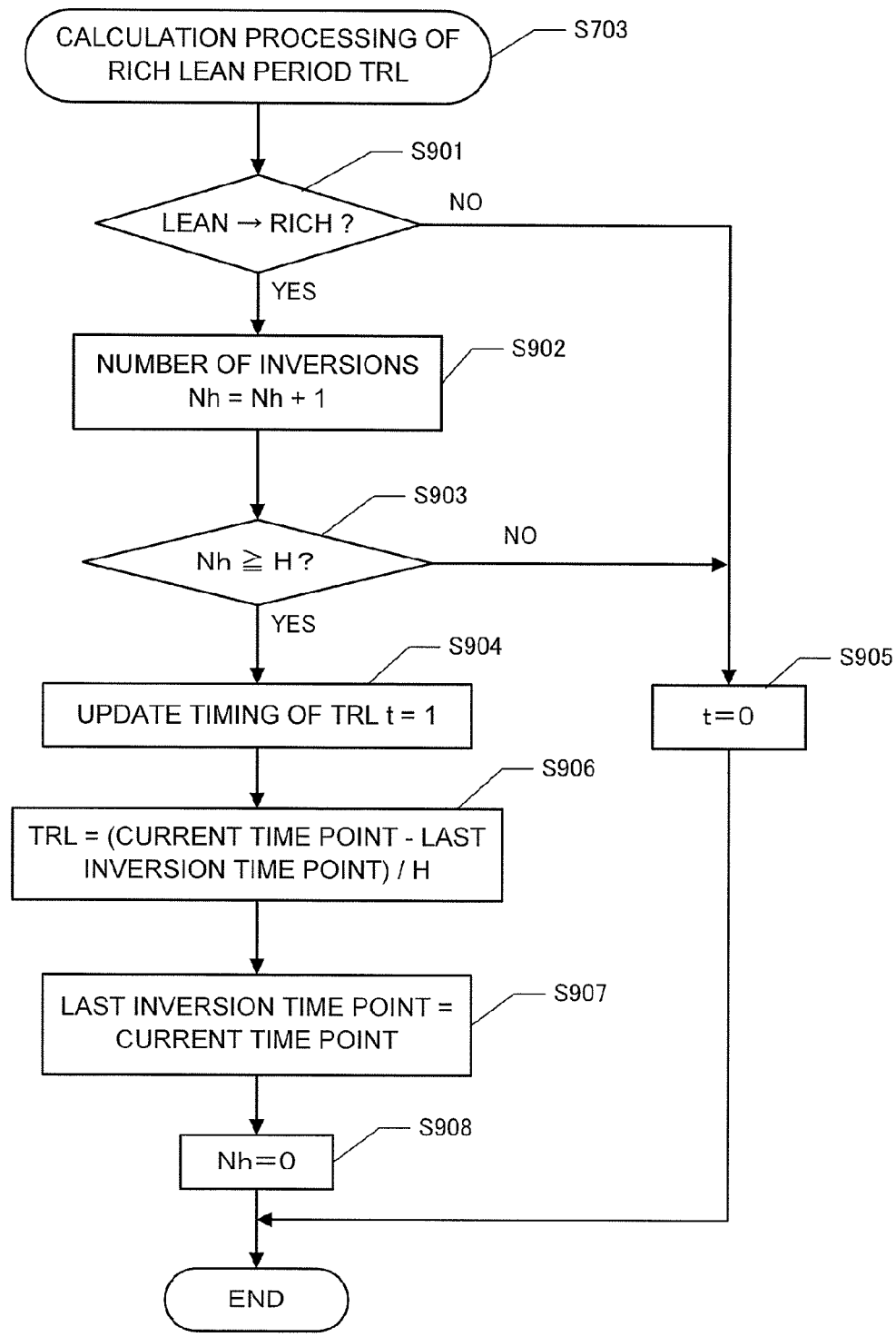
FIG. 9 is a flow chart specifically showing rich lean period calculation processing in FIG. 7.
Figure 10:
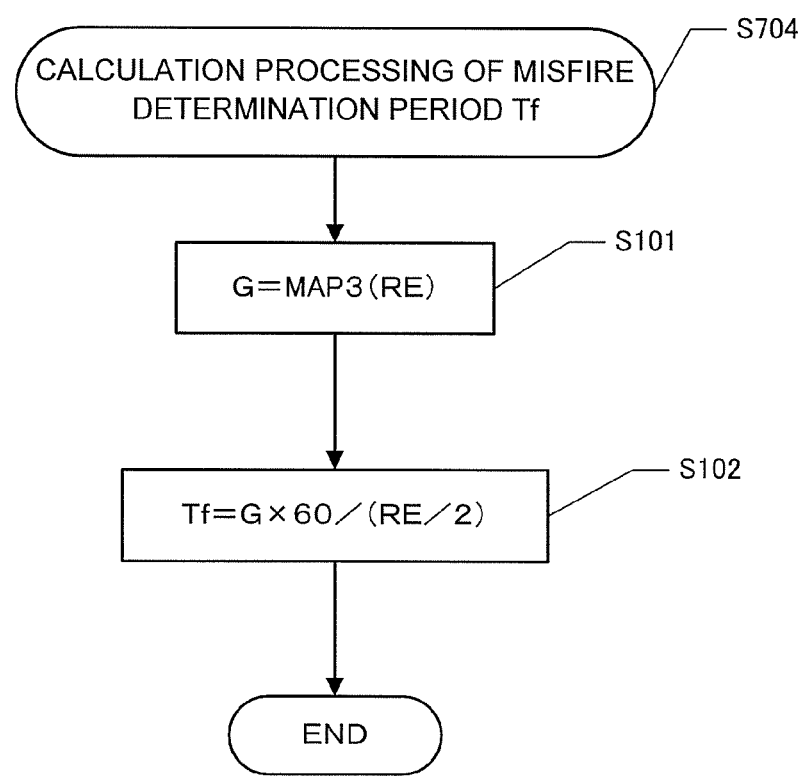
FIG. 10 is a flow chart specifically showing misfire determination period calculation processing in FIG. 7.

In addition, FIG. 9 is a flow chart specifically showing rich lean period calculation processing (step S703) in FIG. 7, and FIG. 10 is a flow chart specifically showing misfire determination period calculation processing (step S704) in FIG. 7.

Here, note that it is assumed that the flow charts of FIG. 7 through FIG. 10 are carried out at a fixed period (for example, 5 ms).

Figure 11:
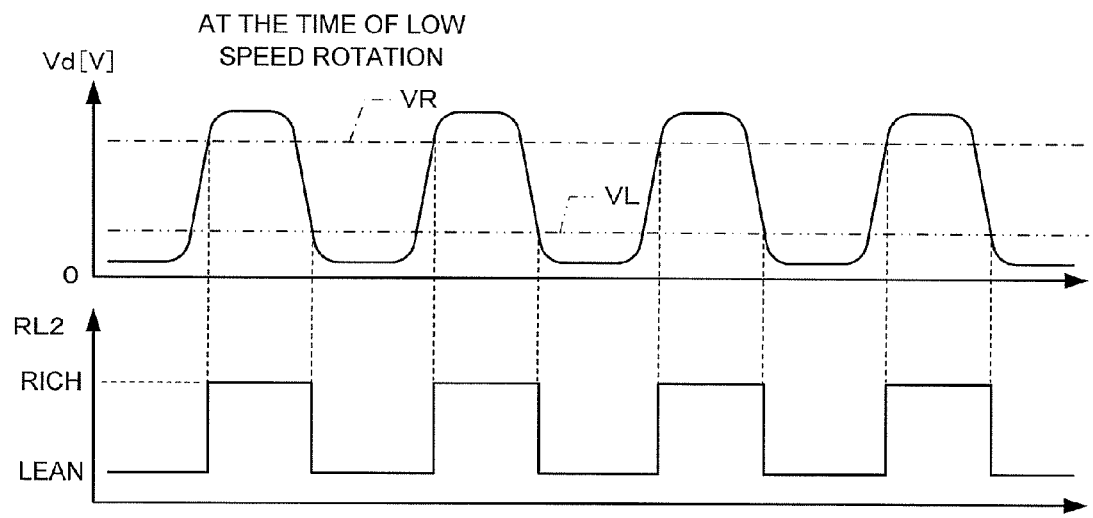
FIG. 11 is an explanatory view showing the relation between an A/D value waveform of the O2 sensor and a rich lean signal at the time of low speed rotation.
Figure 12:
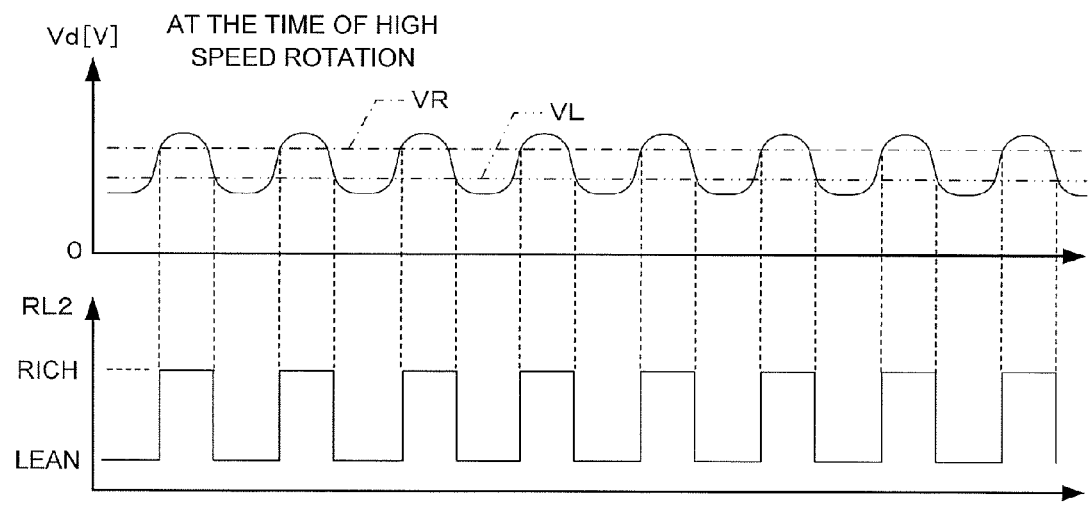
FIG. 12 is an explanatory view showing the relation between an A/D value waveform of the O2 sensor and a rich lean signal at the time of high speed rotation.

FIG. 11 and FIG. 12 are explanatory views showing relations between the waveforms of the A/D value Vd of the O2 sensor 15 and the rich lean signal RL2, wherein FIG. 11 shows the waveform at the time of low speed rotation, and FIG. 12 shows the waveform at the time of high speed rotation.

Although the A/D value Vd at the time of low speed rotation is greatly different at the rich side and at the lean side, as shown in FIG. 11, the waveform of the A/D value Vd at the time of high speed rotation becomes blunt or dull due to an output delay of the O2 sensor 15, as shown in FIG. 12, so it can be understood that the value at the rich side drifts to the lean side.

Accordingly, it is necessary to set the rich determination voltage VR and the lean determination voltage VL in a variable manner in accordance with the engine rotational speed RE, as shown in FIG. 11 and FIG. 12. However, the presence or absence of a misfire can not be determined only from the periodic changes of the rich lean signals RL2 of FIG. 11 and FIG. 12.

In FIG. 7, first, the second air fuel ratio determination unit 26 carries out rich lean determination processing based on the comparison of the A/D value Vd of the O2 sensor 15 with the rich determination voltage VR and the lean determination voltage VL (step S701).

In the following, specific reference will be made to the rich lean determination processing (step S701) by the second air fuel ratio determination unit 26, while referring to FIG. 8.

In FIG. 8, the second air fuel ratio determination unit 26 first obtains the engine rotational speed RE from the crank angle degree θ1 corresponding to a rotation sensor signal (step S801), and calculates the rich determination voltage VR and the lean determination voltage VL by searching for the individual maps MAP1 (RE) and MAP2 (RE) of the rich determination voltage VR and the lean determination voltage VL which have been set in advance, in accordance with the engine rotational speed RE (step S802).

In general, when the rich determination voltage VR is set to 0.8 [V] and the lean determination voltage VL is set to 0.1 [V], in an idle region (e.g., about 1,000 r/min), there will be no problem.

However, at the time of the occurrence of a misfire, the rich lean signal RL2 is outputted in synchronization with the rotation of the engine 1, as stated before (FIG. 5), so that the rich lean period TRL becomes shorter, as a consequence of which the output delay of the O2 sensor 15, which has not been a problem in a low rotational speed region, will come to have greater influence.

For example, the output of the lean signal drifts to the rich side, and the output of the rich signal drifts to the lean side, so that the output waveform of the O2 sensor 15 becomes dull, resulting in a waveform, as shown in FIG. 12.

Accordingly, by actually measuring, in advance, the rich determination voltage VR and the lean determination voltage VL corresponding to the engine rotational speed RE with the engine 1, and carrying out the adaptation of the maps based thereon, it is possible to determine a change in the period of the rich lean signal RL2 resulting from a misfire, even in a state where the engine rotational speed RE is high (see FIG. 12), thus making it possible to carry out a misfire determination not only in the low speed rotation region but also in the high speed rotation region.

When the rich determination voltage VR and the lean determination voltage VL are set according to the step S802, subsequently, the second air fuel ratio determination unit 26 obtains the A/D value Vd of the O2 sensor 15 from the AD converter 24 (step S803).

Then, it is determined whether the A/D value Vd obtained in step S803 is larger than the rich determination voltage VR (step S804), and when a determination is made that Vd>VR (that is, YES), the rich lean signal RL2 (determination result) is set to "RICH" (step S806), and the processing routine of FIG. 8 is ended.

On the other hand, when a determination is made in step S804 that Vd≤VR (that is, NO), subsequently, it is determined whether the A/D value Vd is smaller than the lean determination voltage VL (step S805).

When a determination is made in step S805 that Vd<VL (that is, YES), the rich lean signal RL2 (determination result) is set to "LEAN" (step S807), and the processing routine of FIG. 8 is ended.

On the other hand, when a determination is made in step S805 that Vd≥VL (that is, NO), it is assumed that the A/D value Vd can not be determined to be neither rich nor lean. As a result, the last value is held (step S808), without updating the rich lean signal RL2 (determination result), and the processing routine of FIG. 8 is ended.

When the generation of the rich lean signal RL2 (update of the determination result) is completed according to the step S701 in FIG. 8, a return is made to FIG. 7, where the rich lean period calculation unit 27 in the ECU 17 determines whether a misfire detecting condition is satisfied (step S702).

In the first embodiment of the present invention, a misfire determination is carried out by focusing on the fact that the value of the rich lean period TRL in the course of the O2 feedback control is different from the value of the rich lean period TRL at the time of the occurrence of a misfire to a large extent, as stated above (FIG. 6).

Accordingly, the rich lean period calculation unit 27 confirms whether the O2 feedback control is being carried out, and if the O2 feedback control is being carried out, a determination is made that the misfire detecting condition holds, but if the O2 feedback control is not being carried out, a determination is made that the misfire detecting condition does not hold.

In step S702, when a determination is made that the misfire detecting condition does not hold (that is, NO), the processing routine of FIG. 7 is ended immediately, whereas when a determination is made that the misfire detecting condition holds (that is, YES), the calculation processing of the rich lean period TRL is carried out (step S703).

In the following, specific reference will be made to the calculation processing of the rich lean period TRL (step S703) by the rich lean period calculation unit 27, while referring to FIG. 9.

In FIG. 9, the rich lean period calculation unit 27 first determines, based on the rich lean signal RL2, whether the state of the exhaust gas E has changed from a lean state to a rich state (step S901).

In step S901, in cases where a determination is made that the state of the exhaust gas E has not changed from a lean state to a rich state (that is, NO), i.e., in cases where a lean or rich state continues from the last control period, or in cases where the state of the exhaust gas E has changed from a rich state to a lean state, update timing t of the rich lean period TRL is cleared to "0" (step S905), and the processing routine of FIG. 9 is ended.

On the other hand, in step S901, in cases where a determination is made that the state of the exhaust gas E has changed from a lean state to a rich state (that is, YES), the number of inversions Nh of the A/D value Vd is incremented by "1" (step S902), and it is then determined whether the number of inversions Nh has reached a prescribed number of times H or more (step S903).

When a determination is made in step S903 that Nh<H (that is, NO), the routine advances to step S1, where the update timing t of the rich lean period TRL is cleared to "0" (step S905), and then, the processing routine of FIG. 9 is ended.

On the other hand, when a determination is made in step S903 that Nh≥H (that is, YES), the update timing t of the rich lean period TRL is set to "1" (step S904), and then, the rich lean period TRL is obtained or calculated, as shown in the following equation (1) (step S906).

$$TRL = (\text{current time point} - \text{last inversion time point})/H \quad (1)$$

Here, note that the reason for setting the update timing t of the rich lean period TRL in steps S904, S905 is to carry out the misfire determination processing in FIG. 7, only in cases where the rich lean period TRL has been updated (i.e., the processing in step S906 has been carried out).

The processing of step S906 is carried out only when the change from a lean state to a rich state has been made H times, so that a mean value of the rich lean period TRL for the number of times H can be calculated by subtracting the last inversion time point (timing at which the rich lean period TRL was updated last time) from the current time point, and by dividing it by the prescribed number of times H, as shown in the equation (1).

In the calculation operation (steps S901 through S906) of the rich lean period TRL, the reason for obtaining the mean period at the time when the rich lean signal RL2 based on the A/D value Vd has been inverted H times is to prevent an incorrect determination from occurring at the timing at which the operating state of the engine 1 has changed.

After the rich lean period TRL has been calculated in step S906, the last inversion time point is updated and set to the current time point in preparation for the next calculation operation (step S907), and the number of inversions Nh of the A/D value Vd is initialized to "0" (step S908), after which the processing routine of FIG. 9 is ended.

When the rich lean period TRL is calculated according to the processing routine of FIG. 9 (step S703), a return is made to the processing routine of FIG. 7, wherein processing (steps S704 through S711) by the misfire determination unit 28 in the ECU 17 is carried out.

The misfire determination unit 28 first carries out calculation processing of the misfire determination period Tf to be used as a comparison reference for the rich lean period TRL, based on the engine rotational speed RE (step S704).

In the following, specific reference will be made to the calculation processing of the misfire determination period Tf (step S704) by the misfire determination unit 28, while referring to FIG. 10.

In FIG. 10, first, in order to set the gain G by which a period for every two revolutions of the engine 1 (i.e., indicated by the alternate long and short dash line in FIG. 6) is multiplied, the misfire determination unit 28 carries out a map search of an optimal gain G for the current engine rotational speed RE with reference to a misfire determination gain map MAP3 (RE) which has been set in advance corresponding to the engine rotational speed RE (step S101).

As mentioned before (FIG. 4 and FIG. 5), the rich lean period TRL for misfire determination reflects the rich lean signal in which the rich lean change by misfiring and the rich lean change by air fuel ratio control superpose with each other, and hence it can become shorter or longer than the two-revolution period of the engine 1.

Accordingly, as shown in FIG. 6, the misfire determination period Tf for detecting a misfire in a reliable manner without making an incorrect determination is set.

In FIG. 6, in cases where the engine rotational speed RE is 1,000 r/min-3,000 r/min, the rich lean period TRL at the time of O2 feedback control is about 2 seconds-0.5 seconds, but in contrast to this, the rich lean period TRL at the time of misfiring (gray area) is about 120 ms-40 ms.

That is, the rich lean period TRL in the course of O2 feedback control varies to a large extent with the presence or absence of a misfire, as mentioned above, and hence, by multiplying the two-revolution period of the engine 1 by the gain G, it becomes possible to set the misfire determination period Tf for detecting a misfire in a reliable manner without making an incorrect determination, so that a misfire state can be detected in a reliable manner.

Accordingly, subsequent to the setting (step S101) of the gain G, the misfire determination unit 28 calculates, as the misfire determination period Tf, a value which is obtained by multiplying the period for every two revolutions of the engine 1 by the gain G, as shown in the following equation (2) (step S102), and then ends the processing routine of FIG. 10.

$$Tf = G \times 60/(RE/2) \quad (2)$$

When the misfire determination period Tf is calculated according to the processing routine of FIG. 10 (step S704), a return is made to the processing routine of FIG. 7, where the misfire determination unit 28 determines whether the update timing t for the rich lean period TRL obtained in step S904 and step S905 within step S703 (FIG. 8) is "1" (step S705).

In step S705, when a determination is made that t=0 (that is, NO), the processing routine of FIG. 7 is ended immediately.

On the other hand, in step S705, when a determination is made that t=1 (that is, YES), subsequently, a comparison is made between the rich lean period TRL obtained in step S703 and the misfire determination period Tf obtained in step S704, and it is determined whether the rich lean period TRL is shorter than the misfire determination period Tf (step S706).

Here, note that the reason for the determination in step S705 is that the misfire determination processing after step S706 onwards is to be carried out only at the timing when the rich lean period TRL is updated (t=1), as mentioned above.

In step S706, when a determination is made that TRL<Tf (that is, YES), it is assumed to be in a state where a misfire may have occurred, and the number of misfires Nf is incremented by "1" (step S707), so that it is determined whether the number of misfires Nf is larger than a prescribed number of times M (misfire failure determination value) (step S709).

On the other hand, in step S706, when a determination is made that TRL≥Tf (that is, NO), it is assumed that a misfire has not occurred, and the number of misfires Nf is initialized to "0" (step S708), after which the processing routine of FIG. 7 is ended.

In step S709, when a determination is made that Nf<M (that is, YES), the misfire failure flag F is set to "1" (step S710), and the processing routine of FIG. 7 is ended.

On the other hand, in step S709, when a determination is made that Nf≤M (that is, NO), the misfire failure flag F is set to "0" (step S711), and the processing routine of FIG. 7 is ended.

Here, note that steps S707 through S711 are redundant processing for preventing the miss detection of a misfire state in spite of the fact that a misfire has not actually occurred.

According to these steps, only in cases where there is a possibility that a misfire will occur continuously M times, a misfire failure can be finally determined.

In cases where a misfire failure is detected by the misfire determination processing of FIG. 7, the misfire determination unit 28 generates a misfire failure flag F (=1) indicative of a misfire state, and inputs it to the fuel injection control unit 23 and the indication control unit 29.

The fuel injection control unit 23 stops the fuel injection control on the injector 12 in response to the misfire failure flag F (=1), so that the discharge of unburnt gas to the exhaust passage 14 is prevented, thus protecting the three-way catalyst 16.

In addition, the indication control unit 29 drives the failure indicator 19 in a blinking manner in response to the misfire failure flag F (=1), thereby informing the occurrence of a misfire failure to the operating person.

On the other hand, in a trouble or failure indication other than a misfire failure, the indication control unit 29 drives the failure indicator 19 in a lighted manner, thereby clearly distinguishing the case of a misfire failure and the case of other failures from each other, so that the misfire failure is informed to the operating person in a reliable manner.

Here, note that the engine 1 is slowed down to stop by the stopping of fuel injection, but in order to stop the engine 1 still more promptly, the electrical energization (ignition control) of the ignition coil 5 by means of the ECU 17 may be stopped in response to the misfire failure flag F (=1).

In this manner, in cases where the rich lean period TRL of the O2 sensor 15 is smaller than the misfire determination period Tf (i.e., the value which is obtained by multiplying the two-revolution period of the engine 1 by the predetermined gain G), a determination is made that the engine 1 is in a misfire state, whereby it becomes possible to determine the misfire state with a high degree of accuracy, without making an incorrect determination.

Moreover, in step S709, a misfire failure is finally detected only in cases where the number of misfires Nf is continuously incremented to exceed the prescribed number of times M, as a result of which even in cases where the engine operating state has changed (i.e., at the time of acceleration or deceleration of the engine 1 or at the time of a sudden change of the engine load, etc.), it is possible to detect the occurrence of a misfire in a reliable manner, without making an incorrect determination.

Here, note that in the above-mentioned description, in step S802, in order to set the rich determination voltage VR and the lean determination voltage VL, map search is carried out based on the engine rotational speed RE by the use of the maps MAP1 (RE) and MAP2 (RE), but the rich determination voltage VR and the lean determination voltage VL may be set in a variable manner in accordance with the engine operating state which is based on not only the engine rotational speed RE but also other parameters in combination therewith, such as using a map of the engine rotational speed RE and the charging efficiency.

Further, in step S702, when the engine is in the course of O2 feedback control, a determination is made that the misfire detecting condition holds, but other conditions such as the engine rotational speed RE, the engine load, etc., may be added in cases where the engine is in a low load region and the three-way catalyst 16 will not be damaged by misfiring.

Furthermore, in an engine operation region in which it is impossible to make a distinction between a misfire state and a normal state, a mask condition for the prohibition of misfire determination may be added in order not to carry out a misfire determination.

In addition, in steps S901 and S902, at the time of change from a lean state to a rich state, the number of inversions Nh of the A/D value Vd of the O2 sensor 15 is incremented by "1", but the number of inversions Nh may be incremented at the time of change from a rich state to a lean state, or the number of inversions Nh may be incremented both at the time of change from a lean state to a rich state and at the time of change from a rich state to a lean state.

Moreover, in step S101, in order to obtain the gain G for calculating the misfire determination period Tf, map search is carried out based on the engine rotational speed RE by the use of the map MAP5 (RE), but the gain G may be set in a variable manner in accordance with the engine operating state which is based on not only the engine rotational speed RE but also other parameters in combination therewith, such as using the engine rotational speed RE and the charging efficiency.

Further, although at the time of misfire failure, fuel injection is stopped by stopping the engine 1, the engine 1 may not be stopped, and the engine rotational speed RE may instead be limited to low speed rotation.

Furthermore, although the misfire failure is informed to the operating person by the use of the MIL as the failure indicator 19 and by means of driving the MIL in a blinking manner, it may be informed to the operating person by the use of an arbitrary failure indication unit (an LED, etc.) and by means of displaying a different color, etc., instead of using the MIL.

As described above, the control apparatus for a general purpose engine according to the first embodiment of the present invention is provided with: the variety of kinds of sensors that generate detected values corresponding to the load and the rotational speed of the engine 1; the three-way catalyst 16 that is arranged in the exhaust passage 14 of the engine 1; the O2 sensor 15 that is arranged at the upstream side of the three-way catalyst 16; the basic injection amount calculation unit 21 that calculates the basic amount of fuel Qb to be injected to the engine 1 based on the individual detected values of the variety of kinds of sensors; the first air fuel ratio determination unit 25 that determines, based on the output value (A/D value Vd) of the O2 sensor 15, whether an air fuel ratio of a mixture is rich or lean; the fuel injection amount correction unit 22 that carries out feedback correction of the basic fuel injection amount Qb to a value corresponding to a stoichiometric air fuel ratio in accordance with the result (rich lean signal RL1) of the determination of the first air fuel ratio determination unit 25; the fuel injection control unit 23 that supplies fuel to the engine 1 so as to make it match the corrected fuel injection amount Qf calculated by the fuel injection amount correction unit 22; the second air fuel ratio determination unit 26 that determines, based on a comparison of the output value of the O2 sensor 15 with the rich determination voltage VR or the lean determination voltage VL, whether the air fuel ratio of the mixture is rich or lean; the rich lean period calculation unit 27 that calculates the rich lean cycle or period TRL of the output value of the O2 sensor 15 in accordance with the result (rich lean signal RL2) of the determination of the second air fuel ratio determination unit 26; and the misfire determination unit 28 that determines the presence or absence of a misfire in the engine 1 based on the rich lean period TRL; wherein the fuel injection control unit 23 stops the injection of fuel to the engine 1, in cases where it is determined by the misfire determination unit 28 that there is a misfire (F=1).

In addition, the rich determination voltage VR and the lean determination voltage VL are calculated by means of map interpolation using the engine rotational speed RE as a parameter.

The rich lean period calculation unit 27 calculates an average or mean value for a prescribed number of times H of the output cycle or period of the O2 sensor 15 as the rich lean period TRL.

The misfire determination unit 28 calculates, as the misfire determination period Tf, a value which is obtained by multiplying the two-revolution period of the engine rotational speed RE by the gain G corresponding to the engine rotational speed RE, determines a misfire occurrence state in cases where the rich lean period TRL is shorter than the misfire determination period Tf, and determines the presence of a misfire (F=1) in cases where the misfire occurrence state continues over a predetermined period of time (i.e., the prescribed number of times M which becomes the misfire failure determination value).

Further, the control apparatus for a general purpose engine according to the first embodiment of the present invention is provided with the failure indicator 19 for informing the occurrence of failure in cases where a failure in various kinds of control functions of the engine 1 is detected, and the indication control unit 29 for driving the failure indicator 19. The indication control unit 29 drives the failure indicator 19 in a different indication mode from that at the time of failure other than a misfire, in cases where it is determined by the misfire determination unit 28 that there is a misfire (F=1).

That is, the basic injection amount calculation unit 21 and the fuel injection amount correction unit 22 calculate, based on an amount of intake air detected in advance, the corrected fuel injection amount Qf to be supplied to the engine 1 in a manner such that the corrected fuel injection amount Qf matches the stoichiometric air fuel ratio. The fuel injection control unit 23 injects the corrected fuel injection amount Qf by means of the injector 12. The first air fuel ratio determination unit 25 detects the air fuel ratio of exhaust gas E from the output value of the O2 sensor 15. The fuel injection amount correction unit 22 carries out feedback control in accordance with the rich or lean state of the exhaust gas E in a manner such that the amount of fuel to be injected matches the stoichiometric air fuel ratio.

In parallel to the above-mentioned fuel feedback control, the second air fuel ratio determination unit 26 sets the rich determination voltage VR and the lean determination voltage VL from the O2 sensor output value, and determines, based on the individual determination voltages VR and VL, whether the air fuel ratio is rich or lean at the time of operation of the engine 1. The rich lean period calculation unit 27 calculates the rich lean period TRL of the exhaust gas E during the operation of the engine 1.

The misfire determination unit 28 detects a misfire state by the use of the misfire determination period Tf by making use of the following fact. That is, at the time of normal operation, the rich lean period TRL is controlled to about few seconds (i.e., about 0.5 seconds-2 seconds) by means of a feedback unit, whereas at the time of the occurrence of a misfire, unburnt gas is discharged once per two revolutions of the engine 1, and hence, a lean determination is made, so that the rich lean period TRL becomes a period in which the two-revolution period of the engine 1 and the rich lean period by the feedback unit superpose with each other.

According to the above construction, even in the engine 1 (general purpose engine) in which it is difficult to detect an angular acceleration change due to a misfire because the rotational inertia of the engine is large, and which can be mounted on various kinds of models, it is possible to detect a misfire state with a high degree of accuracy, as a result of which damage to the three-way catalyst 16 can be prevented by stopping fuel injection thereby to stop the engine at the time of the occurrence of a misfire, and at the same time, harmful components can be prevented from continuing to be discharged into atmospheric air.

In addition, the adaptation operation of the individual maps MAP1(RE) through MAP3 (RE) can be carried out easily by making map-adaptative in advance the rich determination voltage VR and the lean determination voltage VL at the time of the occurrence of a misfire, as well as the gain G to the two-revolution period of the engine 1.

That is, the occurrence of a misfire can be detected with a high degree of accuracy, while reducing the adaptation man hours of the misfire determination, and the engine 1 is stopped at the time of the occurrence of a misfire, whereby damage to the three-way catalyst 16 can be prevented, so that discharge of harmful components into the atmospheric air can be suppressed.

Moreover, because in the rich lean period TRL for determining the occurrence of a misfire, the cycle or period for every two revolutions of the engine 1 and the cycle or period by the feedback unit superpose with each other, the gain G is set according to the engine rotational speed RE, and the value which is obtained by multiplying the two-revolution period by the gain G is set as the misfire determination period Tf, whereby a misfire state can be determined with high accuracy in a simple and easy manner, without making an incorrect determination.

Further, in cases where a misfire determination is carried out by the use of the rich lean period TRL, when the state where the rich lean period TRL is smaller than the misfire determination period Tf continues in a consecutive manner, a determination is made that there is a misfire (F=1), whereby a misfire state can be detected without making an incorrect determination.

In addition, in cases where a misfire state has been detected, by stopping the engine 1, it is possible to prevent damage to the three-way catalyst 16, and to suppress the discharge of harmful components into the atmospheric air, and at the same time, by driving the failure indicator 19 in a blinking manner, it is possible to warn the operating person of the failure state by means of the failure indicator 19.

Moreover, the indication mode of the failure indicator 19 can be changed so that the operating person can recognize whether the stopped state of the engine 1 is due to a misfire or the stopped state of the engine 1 is due to other failures. As a result, at the time of stopping the engine 1 in order to protect the three-way catalyst 16, too, it is possible to warn the operating person of the fact that the engine 1 has been stopped due to a misfire.

Here, note that it goes without saying that the present invention is not limited to the above-mentioned construction, but includes various combinations of those constructions which can be put into practice.

What is claimed is:

1. A control apparatus for a general purpose engine comprising:
   a variety of kinds of sensors that generate detected values corresponding to a load and a rotational speed of the general purpose engine;
   a three-way catalyst that is arranged in an exhaust passage of said general purpose engine;
   an O2 sensor that is arranged at the upstream side of said three-way catalyst;
   a basic injection amount calculation unit that calculates a basic amount of fuel to be injected to said general purpose engine based on the individual detected values of said variety of kinds of sensors;
   a first air fuel ratio determination unit that determines, based on a comparison of an output value of said O2 sensor with a rich-lean determination voltage, whether an air fuel ratio of a mixture is rich or lean;
   a fuel injection amount correction unit that carries out feedback correction of said basic fuel injection amount to a value corresponding to a stoichiometric air fuel ratio in accordance with a result of the determination of said first air fuel ratio determination unit;
   a fuel injection control unit that supplies fuel to said general purpose engine so as to make it match a corrected fuel injection amount calculated by said fuel injection amount correction unit;
   a second air fuel ratio determination unit that determines, based on a comparison of the output value of said O2 sensor with a rich determination voltage or a lean determination voltage, whether the air fuel ratio of the mixture is rich or lean;
   a rich lean period calculation unit that calculates a rich lean period of the output value of said O2 sensor in accordance with a result of the determination of said second air fuel ratio determination unit; and a misfire determination unit that determines the presence or absence of a misfire in said general purpose engine based on said rich lean period of the output value of said O2 sensor, wherein said fuel injection control unit stops the injection of fuel to said general purpose engine, in cases where it is determined by said misfire determination unit that there is a misfire.

2. The control apparatus for a general purpose engine as set forth in claim 1, wherein said rich determination voltage and the lean determination voltage are calculated by means of map interpolation using the engine rotational speed as a parameter.

3. The control apparatus for a general purpose engine as set forth in claim 1, wherein said rich lean period calculation unit calculates a mean value for a prescribed number of times of the output period of said O2 sensor as said rich lean period; and said misfire determination unit:
  calculates, as a misfire determination period, a value which is obtained by multiplying a two-revolution period of the rotational speed of said general purpose engine by a gain corresponding to said engine rotational speed;
  determines a misfire occurrence state in cases where said rich lean period is shorter than said misfire determination period; and
  determines the presence of a misfire in cases where said misfire occurrence state continues over a predetermined period of time.

4. The control apparatus for a general purpose engine as set forth in claim 1, further comprising:
  a failure indication unit that informs the occurrence of failure in cases where a failure in various kinds of control functions of said general purpose engine is detected; and
  an indication control unit that drives said failure indication unit,
  wherein said indication control unit drives said failure indication unit in a different indication mode from that at the time of failure other than misfire, in cases where it is determined by said misfire determination unit that there is a misfire.

5. The control apparatus for a general purpose engine as set forth in claim 3, wherein said gain corresponding to said engine rotational speed is determined based on a predetermined misfire determination gain map using said engine rotational speed as a parameter.

6. The control apparatus for a general purpose engine as set forth in claim 1, wherein said rich-lean determination voltage corresponds to said stoichiometric air fuel ratio.

7. The control apparatus for a general purpose engine as set forth in claim 1, wherein said rich-lean determination voltage is different from said rich determination voltage and said lean determination voltage.

8. The control apparatus for a general purpose engine as set forth in claim 1, wherein said determination, by said second air fuel ratio determination, as to whether the air fuel ratio of the mixture is rich or lean, is based on a comparison of the output value of said 02 sensor with said rich determination voltage and said lean determination voltage.

* * * * *